United States Patent
Piccionelli et al.

(10) Patent No.: US 8,027,929 B2
(45) Date of Patent: Sep. 27, 2011

(54) RECORD-KEEPING SYSTEM FOR LIVE PERFORMANCES BEFORE TRANSMISSION OVER A NETWORK

(76) Inventors: Gregory A. Piccionelli, Westlake Village, CA (US); Michael M. Gerardi, Menifee, CA (US)

( * ) Notice: Subject to any disclaimer, the term of this patent is extended or adjusted under 35 U.S.C. 154(b) by 306 days.

(21) Appl. No.: 11/805,269

(22) Filed: May 21, 2007

(65) Prior Publication Data

US 2008/0046342 A1   Feb. 21, 2008

Related U.S. Application Data

(63) Continuation of application No. 10/644,635, filed on Aug. 19, 2003, now abandoned.

(60) Provisional application No. 60/404,737, filed on Aug. 20, 2002.

(51) Int. Cl.
*G06Q 99/00* (2006.01)

(52) U.S. Cl. .......................... 705/317; 705/1.1

(58) Field of Classification Search ................ 705/1, 26, 705/27, 1.1, 317
See application file for complete search history.

(56) References Cited

U.S. PATENT DOCUMENTS

| | | | |
|---|---|---|---|
| 6,171,112 B1 * | 1/2001 | Clark et al. | 434/322 |
| 2003/0051238 A1 * | 3/2003 | Barone, Jr. | 725/32 |
| 2005/0261955 A1 * | 11/2005 | Humble et al. | 705/11 |

OTHER PUBLICATIONS http://www.baytsp.com, retrieved via http://web.archive.org on May 17, 2006, latest date relied on Feb. 8, 2001.*
http://www.videochat.com, retrieved via http://archive.org, retrieved on May 17, 2006, latest date relied on Jan. 19, 2002.*

* cited by examiner

Primary Examiner — Amee A Shah

(57) ABSTRACT

A method of producing a performance, the performance being transmitted over a network, the performance being subject to a record-keeping requirement, includes the steps of: providing information pertaining to a performance in accordance with a record-keeping requirement; associating the information with the performance; providing the associated information to a custodian; and transmitting the performance over a network.

42 Claims, 3 Drawing Sheets

RECORD-KEEPING SYSTEM FOR LIVE PERFORMANCES BEFORE TRANSMISSION OVER A NETWORK

This application is a continuation of U.S. patent application Ser. No. 10/644,635, filed Aug. 19, 2003 now abandoned, which in turn was based on U.S. Provisional Patent Application Ser. No. 60/404,737 filed Aug. 20, 2002, the entire disclosures of each of which are incorporated herein by reference.

FIELD OF THE INVENTION

The present invention relates to methods of producing performances that are subject to a record-keeping requirement, and to systems for producing such performances and for storing the required records with a custodian thereof. More specifically, the present invention relates to methods for producing performances, which can be live or pre-recorded performances, that are transmitted over a network, in particular a computer network such as the Internet.

BACKGROUND OF THE INVENTION

The entertainment industry is a multi-billion dollar industry. In particular, the adult entertainment industry is estimated to comprise a market generating yearly revenues in excess of $50 billion per year. The on-line adult entertainment industry within the larger adult entertainment industry alone generates more that $1 billion in revenue each year.

The creation and commercial distribution of sexually explicit materials has traditionally been subject to a substantial amount of regulation, including record-keeping requirements under U.S. federal law. Of particular concern are the U.S. federal laws that pertain to child pornography and the prevention of exploitation of children in the production of sexually explicit materials. Record-keeping requirements pertaining to the production of images of actual sexually explicit conduct are set forth in 18 U.S.C. §2257 (discussed further below). Sexually explicit conduct the actual performance of which is subject to federal record-keeping requirements is defined at 18 U.S.C. §2256(A)-(D) and includes sexual intercourse (as broadly defined), bestiality, masturbation and sadistic or masochistic abuse.

Any "producer", as defined by the statute, involved in the creation or commercial distribution of visual images which depict any of the actual sexually explicit conduct listed in the statute is required to maintain certain records. This requirement attaches whenever images of actual sexually explicit conduct are created, even if the creator of the images later only distributes, licenses or sells cropped or otherwise "sanitized" versions of the images which do not show the actual sexually explicit conduct. Distributors of images of actual sexually explicit conduct, however, are only required to comply with the record-keeping requirements if the images in fact "contain" visual depictions of actual sexually explicit conduct.

U.S. federal regulations defining those parties who are required to comply with the statutory record-keeping requirements, and setting forth the record-keeping requirements with which such parties must comply, are set forth at 28 C.F.R. Part 75. Producers include "primary producers" and "secondary producers." A primary producer is defined as any person who actually films, videotapes, or photographs a visual depiction of actual sexually explicit conduct. A secondary producer is defined as any person who produces, assembles, manufactures, publishes, duplicates, reproduces, or reissues a book, magazine, periodical, film, videotape, or other matter intended for commercial distribution that contains a visual depiction of actual sexually explicit conduct. Both primary and secondary producers are subject to the record-keeping requirements prescribed by 18 U.S.C. §2257.

Any producer (primary or secondary) of any material containing one or more visual depictions of actual sexually explicit conduct made after Jul. 3, 1995 must comply with the statutory record-keeping requirements for each performer portrayed in such visual depictions. As specified in 28 C.F.R. Part 75.2, the producer must obtain identification documents showing the legal name and date of birth of each performer obtained by an examination document. In addition, for any performer portrayed in such a depiction after May 26, 1992, the records shall also include a legible copy of the identification document, and, if the document does not contain a recent and recognizable picture of the performer, then a legible copy of a picture identification card. A "picture identification card" for this purpose denotes a document issued by a government entity or by a private entity, such as a school or a private employer, that bears the photograph of the individual and the person's name. Such cards can include a passport, driver's license, work identification card, school identification card, selective service card, or an ID card issued by a state.

In addition to the performer's legal name, the producer must also obtain any name ever used by the performer, including the performer's maiden name (if any), alias, nickname, stage name or professional name. For any performer portrayed in such a depiction made after May 26, 1992, such names must also be indexed by the title or identifying number of the book, magazine, film videotape, or other matter.

A secondary producer may satisfy the record-keeping requirement by accepting from the primary producer copies of the required records as set forth above. The secondary producer shall also keep records of the name and the address of the primary producer from whom the copies of the records were received.

Records required to be maintained according to the foregoing statutory provisions are to be categorized and retrievable to all names of each performer, including the performer's maiden name, aliases, nicknames, stage names and professional names, and also according to the title, number or other similar identifier of each book, magazine, periodical, film, videotape, or other matter.

Any producer required to maintain records as described above must make the records available at the producer's place of business. The business address must refer to a street address and not to a post office box number. Such records are to be maintained as long as the producer remains in business, and in the event that the producer ceases to carry on the business, for five years thereafter.

Each copy of the matter which is subject to the statutory record-keeping requirement must bear a statement describing the location of the required records. The statement must contain the title of the book, magazine, periodical, film or videotape or other matter, or if there is no title, an identifying number or similar identifier which differentiates the matter from other matter which the producer has produced, as well as the date of production, manufacture, publication, duplication, reproduction or reissuance of the matter; the street address at which the required records may be available. If the producer is an organization, such as a corporation, the statement must also contain the name, title and business address of the individual employed by the organization who is responsible for maintaining the required records (i.e., the custodian of the records). The information contained in the statement must be accurate as of the date on which the matter is sold, distributed, redistributed or re-released.

Printed materials must include the required statement either on the first page that appears after the front cover, or on the page on which the copyright information (if any) appears. With respect to films and videotapes that have credits, the statement shall be presented at the end of the "end titles" or final credits and shall be displayed for a sufficient duration to be capable of being read by the average viewer. If the film or videotape has no credits, then the statement shall appear within one minute from the start of the film or videotape and before the opening scene.

Certain depictions are exempted from the record-keeping requirements discussed above. Matter that only contains depictions of actual sexually explicit conduct made prior to Nov. 1, 1990 or is produced, manufactured, published, duplicated, reproduced or reissued prior to May 26, 1992; contains only visual depictions of simulated sexually explicit conduct; or contains only combinations of the preceding types of visual matter, are exempt. Furthermore, if the primary producer certifies to a secondary producer that all visual materials fall within the exempted categories set forth above, then the secondary producer may (but is not required to) affix a statement to every copy of the matter that the matter is not covered by the record-keeping requirements of 18 U.S.C. .sctn.2257 and 28 C.F.R. Part 75.

A person or entity operating a website which is involved in the commercial distribution of visual depictions of actual sexually explicit conduct most likely would be classified as a "secondary producer" as described above, and therefore must comply with the statutory record-keeping requirements. With respect to websites, the location of the required statement describing the location of the records is to be displayed consistent with the manner of display required for the categories of materials which are specifically dealt with in the regulations (i.e., books, magazines and periodicals, and film and videotapes). The notice preferably should appear on the bottom of the home page along with the copyright information, or on a separate page immediately after the home page. In all events, the statement should appear prior to a viewer's accessing pictorial content that includes depictions of actual sexually explicit conduct.

In addition, the following (or similar) disclaimer is beneficially displayed on every website which contains visual depictions of actual or simulated sexual conduct:
ALL OF THE PERFORMERS WHOSE IMAGES APPEAR ON THIS SITE AND WHO ARE DEPICTED OR PORTRAYED AS ENGAGING IN ACTS OF ACTUAL OR SIMULATED SEXUAL CONDUCT WERE OVER 18 YEARS OF AGE AT THE TIME THEY WERE PHOTOGRAPHED.
THERE IS NO INTENT OR ATTEMPT TO PORTRAY OR SUGGEST THAT ANY OF THE PERFORMERS WHOSE IMAGES APPEAR ON THIS SITE AND WHO ARE DEPICTED AS ENGAGING IN ACTS OF ACTUAL OR SIMULATED SEXUAL CONDUCT ARE UNDER THE AGE OF 18 OR WERE UNDER THE AGE OF 18 WHEN THEIR PHOTOGRAPH WAS TAKEN.

A need exists for a method and system of producing a record of a performance, such as a live performance, which is subject to a requirement for record-keeping.

A need also exists for a method and system of obtaining, storing and retrieving information regarding on-line live performers who engage in actual sexually explicit conduct in such performances and thus render the performance subject to a record-keeping requirement such as that set forth at 18 U.S.C. §2257.

SUMMARY OF THE PREFERRED EMBODIMENTS

In accordance with one aspect of the present invention, there is provided a method of producing a live performance, the performance being transmitted over a network, the performance being subject to a record-keeping requirement. The method includes the steps of: providing information pertaining to a live performance in accordance with a record-keeping requirement; associating the information with a live performance; providing the associated information to a custodian; and transmitting the live performance over a network.

In particular embodiments, the live performance is transmitted over a computer network to a viewer.

In additional particular embodiments, the viewer is provided with a statement prior to the transmission of the live performance. The statement includes information pertaining to the live performance in accordance with the record-keeping requirement, and in more particular embodiments includes a location, specifically an address, of the custodian.

According to specific embodiments, the live performance is transmitted over the network only after the associated information is provided to the custodian. In additional specific embodiments, the live performance is transmitted to the viewer only after the viewer provides to a site that controls transmission of the live performance verification that the viewing of the live performance is legally permissible at the viewer's physical location.

In accordance with another aspect of the present invention, there is provided a method of producing a live performance, the performance being transmitted over a network, that includes the steps of: providing an identification of a performer of a live performance; verifying the identification of the performer of the live performance; providing all names used by the performer of the live performance other than the performer's legal name when the performer has at least name other than the performer's legal name; providing an identification of the live performance and a date of the live performance; associating the information so provided; providing the associated information to a custodian; and transmitting the live performance over a network.

In accordance with a further aspect of the present invention, there is provided a method of producing a live performance, the performance being transmitted over a network, which includes the steps of: providing a verified identification of a performer of a live performance; providing all names used by the performer of the live performance other than the performer's legal name when the performer has at least name other than the performer's legal name; providing an identification of the live performance and a date of the live performance; associating the information so provided; providing the associated information to a custodian; and transmitting the live performance over a network.

In accordance with yet another aspect of the present invention, there is provided a method of producing a live performance, the performance being transmitted over a computer network to a viewer. The method includes the steps of: providing to a custodian prior to commencement of a live performance a verified identification of a performer of the live performance, all names used by the performer of the live performance other than the performer's legal name when the performer has at least name other than the performer's legal name, an identification of the live performance, and a date of the live performance; providing a statement to a viewer over a computer network prior to the commencement of the live performance, the statement including the identification of the live performance, the date of the live performance, and a location of the custodian; and transmitting the live performance to the viewer over the computer network.

The present invention is also beneficially employed when a pre-recorded performance is provided to a viewer over a network. Thus, in accordance with still another aspect of the present invention, there is provided a method of providing a recorded performance to a viewer over a network, the recorded performance being subject to a record-keeping requirement. The method includes the steps of: providing to a custodian information pertaining to a recorded performance in accordance with a record-keeping requirement; providing a statement to a viewer over a network prior to the transmission of the recorded performance to the viewer, the statement including information pertaining to the recorded performance and to the custodian in accordance with the record-keeping requirement; and transmitting the recorded performance to the viewer over the network.

In accordance with still another aspect of the present invention, there is provided a method of providing a recorded performance to a viewer over a network which includes the steps of: providing to a custodian a verified identification of a performer of a recorded performance, all names used by the performer of the live performance other than the performer's legal name when the performer has at least name other than the performer's legal name, an identification of the recorded performance, and a date of the recorded performance; providing a statement to a viewer over a network prior to the transmission of the recorded performance to the viewer, the statement including the identification of the recorded performance, the date of the recorded performance, and a location of the custodian; and transmitting the recorded performance to the viewer over the network.

In accordance with another aspect of the present invention, there is provided a method of transmitting a live performance to a viewer over a network, the performance being subject to a record-keeping requirement. The method includes the steps of: providing information pertaining to a live performance in response to a request from a viewer for a transmission of the live performance over a network, the information being provided in accordance with a record-keeping requirement; associating the information with the live performance; providing the associated information to a custodian; and transmitting the live performance to the viewer over the network.

In accordance with yet a further aspect of the present invention, there is provided a method of producing record of a performance, the performance being transmitted over a network, the performance being subject to a record-keeping requirement. The method includes the steps of: providing information pertaining to a performance in accordance with a record-keeping requirement; associating the information with the performance; providing the associated information to a custodian; and providing means enabling a viewer to access information pertaining to the performance and to the custodian over the network.

Systems for practicing the inventive method are also provided according to an additional aspect of the present invention. In a particular embodiment, a system for producing a record of a live performance, the live performance transmitted over a network, the live performance being subject to a record-keeping requirement, includes: means for entering into a database information pertaining to a live performance in accordance with a record-keeping requirement; means for associating the information with a live performance; means for providing the associated information to a custodian; means for providing a viewer with information pertaining to the live performance in accordance with the record-keeping requirement; and means for providing a viewer with access to a transmission of the live performance after receipt by the viewer of information pertaining to the live performance in accordance with the record-keeping requirement.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Although exemplary performances which are produced according to methods of the present invention may include actual sexually explicit conduct, such that production of visual images of the performance may be subject to statutory regulations as discussed above, the present invention is by no means limited to the production of such performances or to the generation of records pertaining to such performances.

As used herein, the term "custodian" denotes any person who is in possession of at least one record of a performance that is subject to a record-keeping regulation. Such a person can be, for example, a producer as defined in 28 C.F.R. Part 75, or an individual employed by an organization that is itself a producer.

Figure 1:
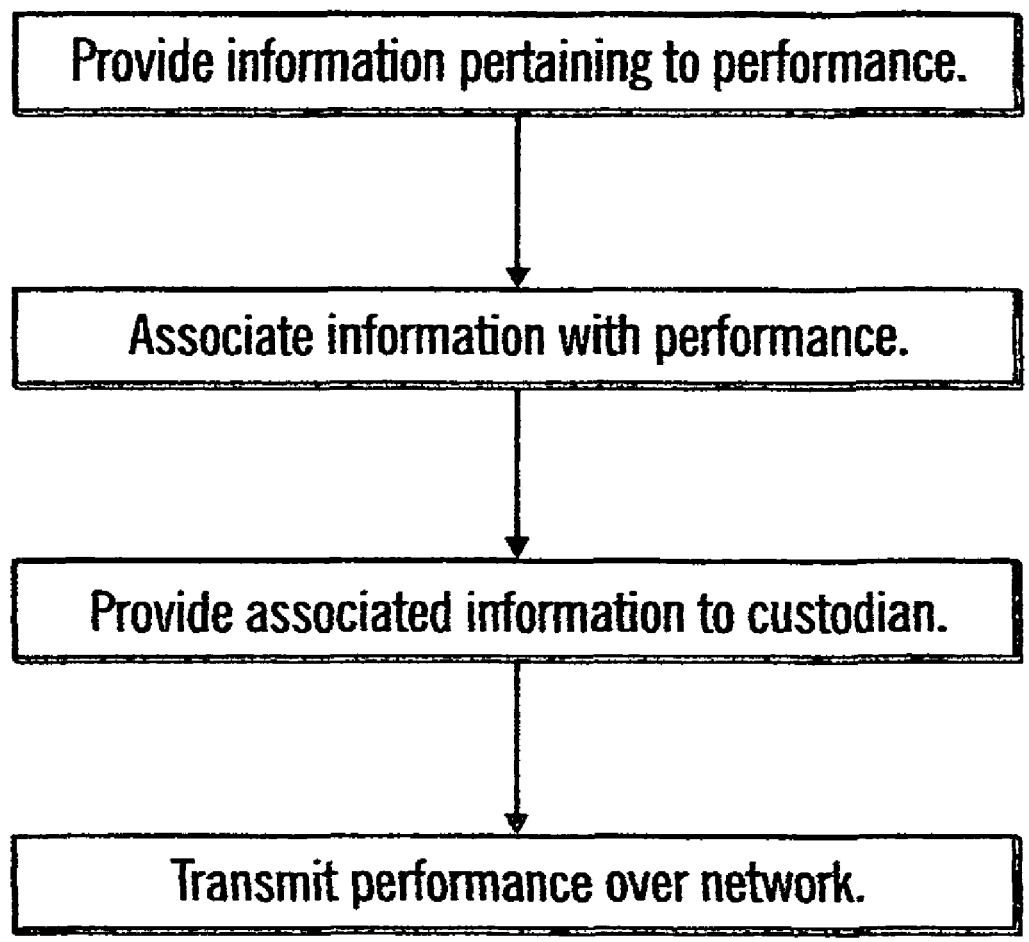
FIG. 1 is a flowchart illustrating a general method according to the invention.

FIG. 1 illustrates a method according to the present invention in a general aspect. Information pertaining to a performance is first provided, more specifically in accordance with a record-keeping requirement such as the requirements established at 18 U.S.C. §2257 and 28 C.F.R. Part 75. The information can be provided, in certain embodiments, by one or more performers of a performance which is subject to the record-keeping requirement, and very specifically by every performer who engages in regulated conduct, such as actual sexually explicit conduct, at any time during the course of the performance. In other particular embodiments, the information can be provided by a producer or other individual in possession of the required information. The performance for which the information is provided can be a live performance or a pre-recorded performance (the recording being a book, magazine or other periodical, film, videotape, etc.).

In specific embodiments, the information is provided prior to a request by a viewer over a network for a transmission of the performance to the viewer over the network. For example, in certain particular embodiments, a performer accesses a site on a network over which a live performance is to be transmitted to a viewer, and then provides the required information. In other specific embodiments, the information is provided subsequent to, e.g., in response to, a request by the viewer for a transmission of the performance.

The information can be provided, in particular embodiments, as direct input by the performer by means of a scanner or other electronic device. In other particular embodiments, the performer logs onto a site and then provides a code, an ID number, a credit card account number or the like to the site. Entry of the code enables the performer to access a database including a file that contains the required information pertaining to the performer, for example by activating a hyperlink to such a database.

The information pertaining to the performance can include an identification of a performer, for example a picture identification card; a maiden name, alias, nickname, stage name or professional name used by the performer; other information pertaining to a performer, such as an address, Social Security number, telephone number, etc.; an identification of the performance, such as a title or identification number; a date of the performance, e.g., the date on which the performance is transmitted over a network or the date on which the performance was first recorded; etc.

Additional information can be provided in more specific embodiments, depending on the record-keeping requirements that pertain to the performance. Thus, for example, if a performer has previously appeared in one or more other performances in which visual depictions of actual sexually explicit conduct were produced, such additional information might include the titles or identification numbers of such performances, the dates of the performances, and the legal and other names used by the performer at the times the performances were produced.

Provision of an accurate identification of the performer is of particular importance. Thus, in more specific embodiments, the performer initially submits an identification, such a scanned picture identification card or other documentation. Next, the identification so submitted is verified, for example by submitting or redirecting the identification to a verification site such as a database of verified identification documents. Once the performer's identification is verified, the performer provides additional information as described herein. In other more specific embodiments, the performer provides a verified identification, for example a code associated with a file in a database of scanned images of verified picture identification cards.

The information is provided, in particular embodiments, to a central site such as a database, or to a site maintained by a producer of the performance. Once the information has been provided to the database or other site, the information is associated with the performance. Thus, for example, the legal name and picture identification of a performer, together with other information such as the performer's aliases or other names other than the performer's legal name, are associated with the title or identification number, and the date, of the performance, for example by storage together in a file in a database.

Once the information has been associated with the performance, the associated information is then provided to a custodian. This can be accomplished, for example, by forwarding the associated information to the custodian via e-mail; by providing the custodian with a hyperlink to a site at which the information can be accessed; by providing the custodian with a hard copy of the information, including a print-out of the performer's personal information and a copy of the performer's scanned picture identification card; or by other means.

After the associated information is provided to the custodian, transmission of the performance to the viewer is enabled. Transmission can commence promptly upon provision of the information to the custodian. In alternative embodiments, the viewer is provided with a statement prior to the transmission of the performance, for example by providing the viewer with a screen including a button which can be activated to access the statement (see FIG. 3b), The button can activate a link to a site maintained by the custodian in specific embodiments, or to a database maintained by another site. The contents of the statement can vary according to the record-keeping requirements to which the performance is subject. For example, the statement can include some or all of the associated information, such as the performer's name(s) and the title and date of the performance, together with a location (e.g., a business street address) of the custodian. Once the viewer accesses the statement, transmission of the performance is authorized and commences. In still other embodiments, the statement is automatically provided to the viewer prior to transmission of the performance to the viewer.

It may be desirable in certain communities to limit access to performances provided according to the present application. Accordingly, in particular embodiments, the physical location of the user is ascertained, for example by GPS means, and access to the performance via the network is controlled on the basis of the user's location. Such access control can be accomplished, for example, according to the methods disclosed in U.S. Pat. No. 6,154,172, to Piccionelli et al., the entire contents of which are incorporated herein by reference. In other particular embodiments, the viewer verifies that viewing the performance in the viewer's physical location is legally permissible, for example by means of a button provided on a screen that provides a statement to this effect to a site controlling transmission of the performance over the network to the viewer.

Revenue-generating specific embodiments of the inventive method include the additional step of providing a viewer's credit card account number to a site that controls transmission of the performance. In such embodiments, the viewer is charged a premium in order to view the performance, for example prior to transmission of the performance.

Figure 2:
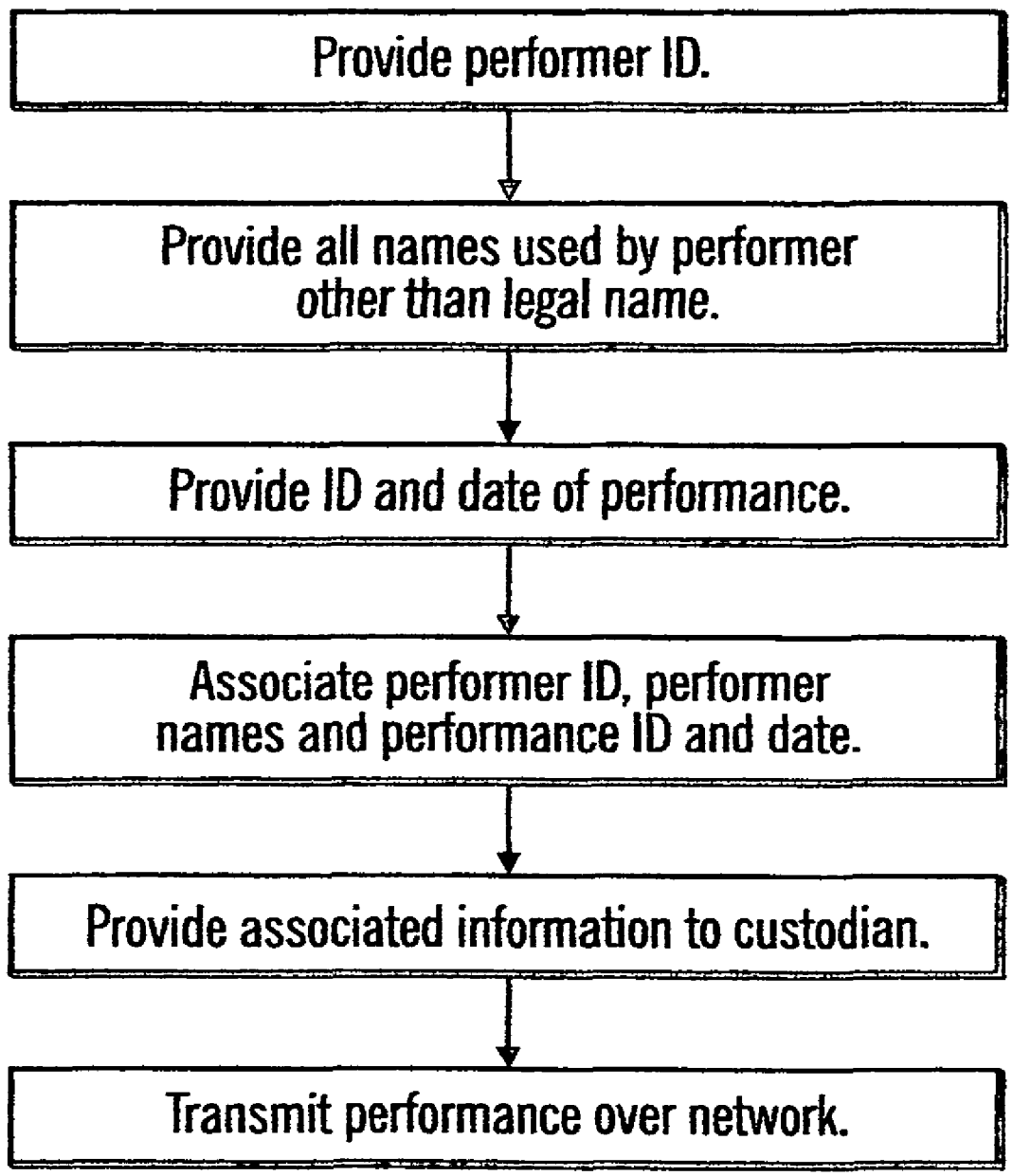
FIG. 2 is a flowchart illustrating a particular method according to the invention in which specific performance information is provided.

FIG. 2 illustrates a more specific method according to the invention. As described herein, the method is implemented by a performer of a live or previously recorded performance; however, the method can also be implemented by other parties, such as producers, or by the performer together with one or more other persons. A performer initially provides an identification, such as a scan of a picture identification card, to a central site controlling transmission of a live performance over a network. The identification can be verified by the central site or by another site, or can be a pre-verified identification. Next, the performer provides all names other than the performer's legal name, if the performer has used such additional names. The performer also provides an identification of the performance, such as a title or identification number, and also a date of the performance, for example, the date on which the performance is to take place (which can be the date of submission of the information, in particular embodiments). The performer's identification and name(s) are then associated with the identification and date of the performance, for example by storage together in a file in a database. The associated information is next provided to a custodian, for example by transmission via a network or by other means as previously mentioned. Once the associated information has been provided to the custodian, the performance is then transmitted over a network to a viewer.

In specific embodiments of the method illustrated in FIG. 2, the viewer is provided with a statement including the identification and date of the performance and the location of the custodian.

According to very specific embodiments, the viewer is further enabled to download a copy of the performance. In such embodiments, the statement described above is incorporated in the download of the performance.

Figure 3A:
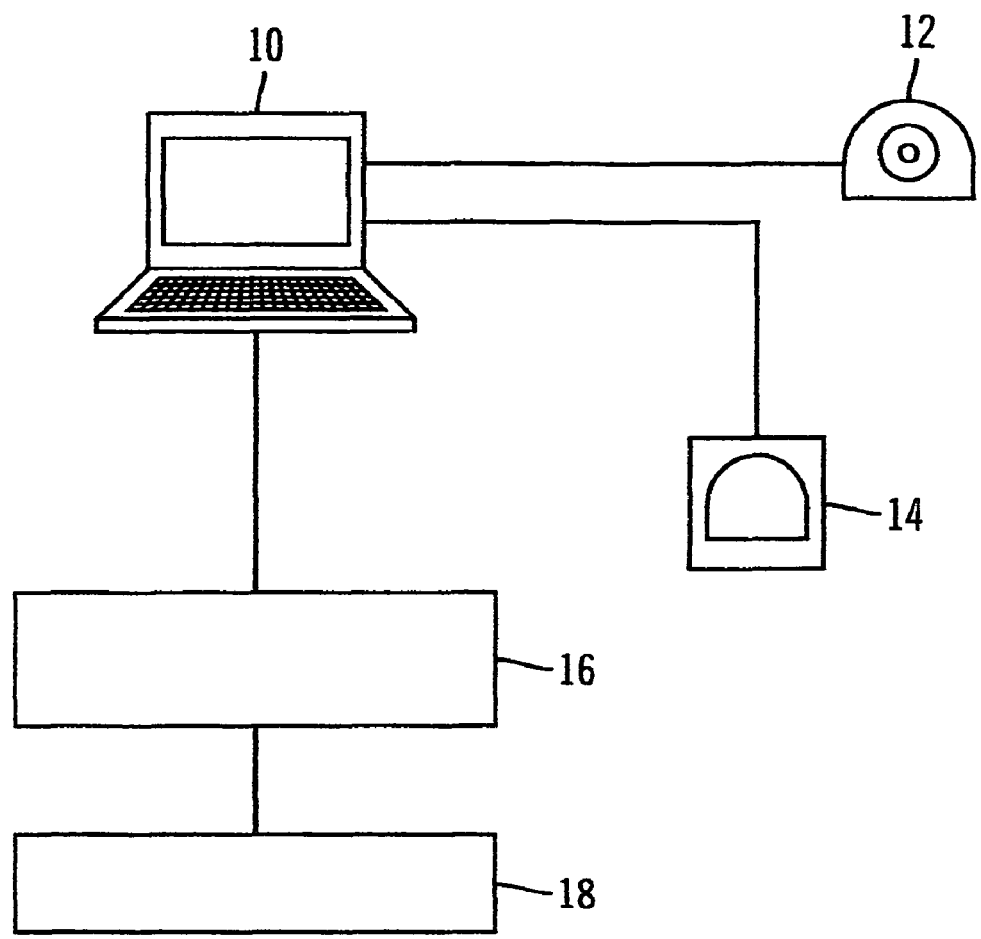
FIGS. 3a-b is a diagram illustrating a system according to the invention and a web page useful in implementing the system.
Figure 3B:
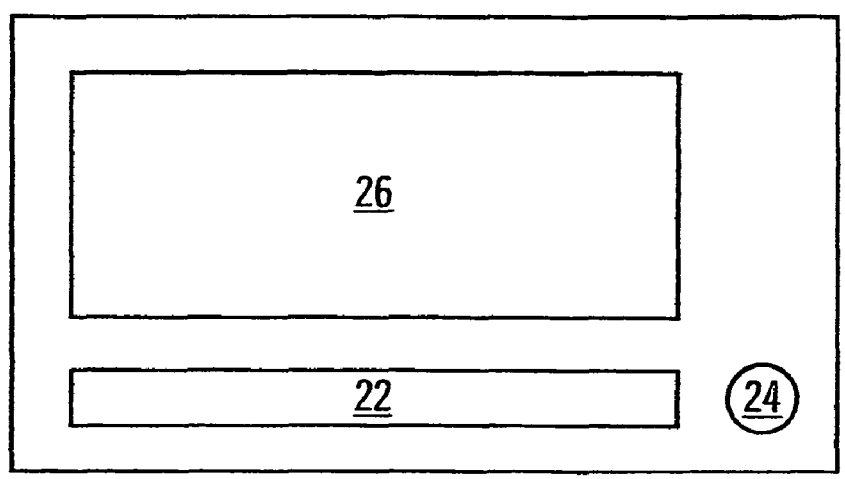

A system useful in implementing methods according to the invention is illustrated in FIGS. 3a-b. In FIG. 3a, a computer 10 is in communication with a video camera 12 and a scanner 14. A performer employs scanner 14 to provide a scanned copy of a picture identification card to a central site 16, and provides additional information such as the performer's legal name, other names such as aliases, stage names, etc., previously used by the performer, a title of a performance in which the performer is to appear, the date of the performance (e.g., the present date), and, in particular embodiments, the titles and dates of other performances in which the performer has appeared together with a listing of aliases, stage names, etc., used by the performer at the time of the prior performances. All of the foregoing information is provided to central site 16, where it is associated, for example by storage in a file. The associated information is then provided to a site 18 maintained by a custodian. Once the information is provided to the custodian, the performer commences the performance, which is transmitted over a network by means of camera 12 to a viewer.

FIG. 3b illustrates an exemplary screen 20 including a box 22 presenting a disclaimer such as that described above, together with a button 24 which can be activated by a viewer in order to access a statement as described above. Window 26 allows the viewer to view a performance as discussed above.

What is claimed is:

1. A method of producing a live performance, the performance being transmitted over a network, the performance comprising content that is subject to a federal record-keeping requirement, the method comprising the steps of:
   (i) providing to a computer system an identification of a performer of a live performance,
   (ii) providing to the computer system names used by the performer of the live performance other than the performer's legal name when the performer has at least a name that is required to be provided by the federal record-keeping regulation other than the performer's legal name,
   (iii) providing to the computer system (a) an identification of the live performance, and (b) a date of the live performance,
   the identifications, names and date in steps (i), (ii) and (iii) being provided in accordance with a federal record-keeping requirement,
   (iv) associating by the computer system the information provided in steps (i), (ii) and (iii) by storing the information pertaining to the performer and the information pertaining to the performance in a storage medium independent of a storage medium used to transmit the performance, and
   (v) transmitting the live performance by a computer system over a network not prior to completion of step (iv).

2. The method of claim 1 wherein the live performance is transmitted over a network to a viewer.

3. The method of claim 2 wherein the viewer is provided with a statement not later than the transmission of the live performance, the statement comprising information pertaining to records regarding the performer and the live performance in accordance with the federal record-keeping requirement.

4. The method of claim 1 wherein the identification of the live performance is a title or an identification number.

5. The method of claim 1 wherein the live performance is performed by a plurality of performers, and wherein steps (i)-(iv) are carried out with respect to each of the plurality of performers.

6. The method of claim 1 wherein at least one of steps (i)-(v) are carried out by a performer of the live performance.

7. The method of claim 1 wherein the identification of the performer of the live performance is obtained from an identification document of the performer of the live performance.

8. The method of claim 7 wherein the identification document is obtained and examined by a producer of the live performance prior to production of the live performance.

9. The method of claim 7 wherein the identification comprises a legal name and a date of birth of the performer.

10. The method of claim 7 wherein the identification document is specified by a federal record-keeping requirement.

11. The method of claim 9 wherein a date of birth of the performer is associated with the information provided in steps (i), (ii) and (iii) as recited in step (iv).

12. The method of claim 1 wherein a copy of at least a portion of the live performance is provided to the independent storage medium of step (iv).

13. The method of claim 12 wherein the copy of at least a portion of the live performance is of sufficient length to identify the performer.

14. The method of claim 1 wherein the identification of the performer of the live performer is verified prior to step (iv).

15. A method of producing a live performance, the performance being transmitted over a network, the performance comprising content that is subject to a federal record-keeping requirement, the method comprising the steps of:
   (i) providing to a computer system identification information from an identification document of a performer of a live performance,
   (ii) providing to the computer system (a) an identification of the live performance, and (b) a date of the live performance,
   the identification information, identification document, names, and identification and date of the live performance in steps (i) and (ii) being provided in accordance with a federal record-keeping requirement,
   (iii) associating by the computer system the information provided in steps (i) and (ii) by storing the information pertaining to the performer and the information pertaining to the performance in a storage medium independent of a storage medium used to transmit the performance, and
   (iv) transmitting the live performance by a computer system over a network not prior to completion of step (iii).

16. The method of claim 15 wherein the live performance is transmitted over a network to a viewer.

17. The method of claim 16 wherein the viewer is provided with a statement associated with the transmission of the live performance, the statement comprising information pertaining to records regarding the performer and the live performance in accordance with the federal record-keeping requirement.

18. The method of claim 15 wherein the identification of the live performance is a title, a number or other similar identifier.

19. The method of claim 15 wherein the live performance is performed by a plurality of performers, and wherein steps (i)-(iii) are carried out with respect to each of the plurality of performers.

20. The method of claim 15 wherein at least one of steps (i)-(iv) are carried out by a performer of the live performance.

21. The method of claim 15 wherein the identification document is obtained and examined by a producer of the live performance prior to production of the live performance.

22. The method of claim 21 wherein identification information of the performer is verified prior to production of the live performance.

23. The method of claim 22 wherein the identification information comprises a legal name and a date of birth of the performer.

24. The method of claim 15 wherein the identification document is specified by a federal record-keeping requirement.

25. The method of claim 22 wherein a date of birth of the performer is associated with the information provided in steps (i) and (ii) as recited in step (iii).

26. The method of claim 15 wherein a copy of at least a portion of the live performance is associated with the information provided in steps (i) and (ii) and provided to the independent storage medium of step (iii).

27. The method of claim 26 wherein the copy of at least a portion of the live performance is of sufficient length to identify the performer.

28. The method of claim 15 wherein names used by the performer of the live performance other than the performer's legal name are provided to the computer system and associated with the information provided in steps (i) and (ii) as recited in step (iii) when the performer has at least a name that is required to be provided by the federal record-keeping requirement other than the performer's legal name.

29. A method of producing a live performance, the performance being transmitted over a network, the performance comprising content that is subject to a federal record-keeping requirement, the method comprising the steps of:
  (i) providing to a computer system a copy of an identification document of the performer of the live performance,
  (ii) providing to the computer system (a) an identification of the live performance, and (b) a date of the live performance,
  the identification document, and identification and date of the live performance in steps (i) and (ii) being provided in accordance with a federal record-keeping requirement,
  (iii) associating by the computer system the information provided in steps (i) and (ii) by storing the information pertaining to the performer and the information pertaining to the performance as one or more records that are segregated from all other records, do not contain any other records, and are not contained within any other record, and
  (iv) transmitting the live performance by a computer system over a network not prior to completion of step (iii).

30. The method of claim 29 wherein the live performance is transmitted over a network to a viewer.

31. The method of claim 30 wherein the viewer is provided with a statement associated with the transmission of the live performance, the statement comprising information pertaining to records regarding the performer and the live performance in accordance with the federal record-keeping requirement.

32. The method of claim 29 wherein the identification of the live performance is a title, a number or other similar identifier.

33. The method of claim 29 wherein the live performance is performed by a plurality of performers, and wherein steps (i)-(iii) are carried out with respect to each of said plurality of performers.

34. The method of claim 29 wherein at least one of steps (i)-(iv) are carried out by a performer of the live performance.

35. The method of claim 29 wherein the identification document is obtained and examined by a producer of the live performance prior to production of the live performance.

36. The method of claim 35 wherein identification information of the performer is verified prior to production of the live performance.

37. The method of claim 36 wherein the identification information comprises a legal name and a date of birth of the performer.

38. The method of claim 29 wherein the identification document is specified by a federal record-keeping requirement.

39. The method of claim 36 wherein a date of birth of the performer is associated with the information provided in steps (i) and (ii) as recited in step (iv).

40. The method of claim 29 wherein a copy of at least a portion of the live performance is associated with the information provided in steps (i) and (ii).

41. The method of claim 40 wherein the copy of at least a portion of the live performance is of sufficient length to identify the performer.

42. The method of claim 29 wherein names used by the performer of the liver performance other than the performer's legal name are provided to the computer system and associated with the information provided in steps (i) and (ii) as recited in step (iii) when the performer has at least a name that is required to be provided by the federal record-keeping requirement other than the performer's legal name.

* * * * *